C. H. SAYRE.
Cultivator-Teeth.
No. 18,471.
Patented Oct. 20, 1857.
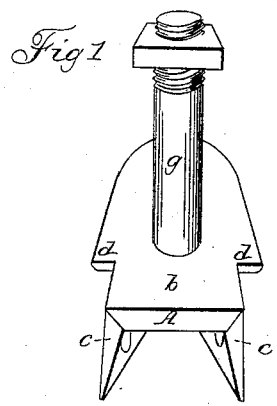
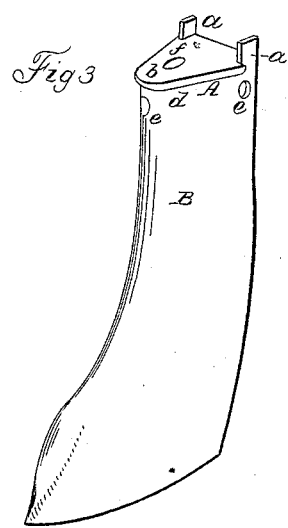
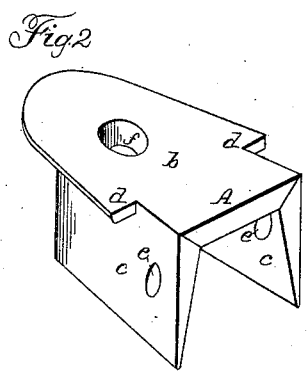
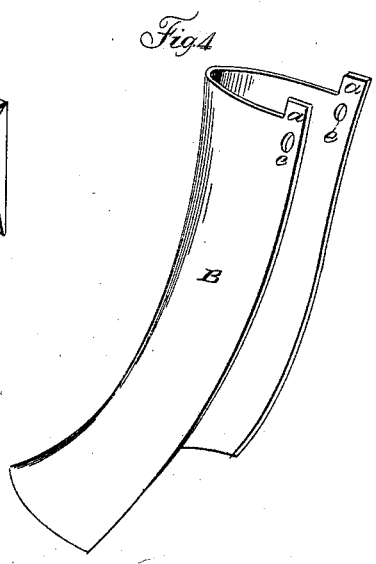

UNITED STATES PATENT OFFICE.

CHAS. H. SAYRE, OF UTICA, NEW YORK, ASSIGNOR TO HIMSELF AND SAMUEL REMINGTON.

IMPROVEMENT IN CULTIVATOR-TEETH.

Specification forming part of Letters Patent No. 18,471, dated October 20, 1857.

*To all whom it may concern:*

Be it known that I, CHARLES H. SAYRE, of Utica, in the county of Oneida and State of New York, have invented a new and useful Improvement in Cultivator-Teeth, of which the following is a full, clear, and exact description of the same, reference being had to the accompanying drawings, making part of this specification, in which—

Figure 1 represents a perspective view of the block-head of my cultivator-tooth with the bolt inserted; Fig. 2, a similar view of the block-head, the bolt being removed. Fig. 3 represents a view in perspective of my cultivator-tooth ready to be secured to the machine; Fig. 4, a similar view of the shank of the tooth.

My improvement relates more particularly to that class of cultivator-teeth made of sheet metal.

Heretofore the block-heads to which the shank of the teeth have been secured have either been cast upon them or the head of the shank fitted into a groove formed on the under side of the block-head, both of which plans are objectionable, the first because of the difficulties attending the operation of casting it, which render it expensive, and the second because of the liability of the individual parts to get lost or misplaced when removed from the machine for the purpose of repairs, &c., and from other causes. To provide a tooth which will not be subject to these and other objections is the object of my improvement; and it consists in a peculiar mode of constructing and securing the block-head to the shank of the tooth, by which superior strength and durability are attained and an easy and substantial mode of attachment to the machine provided. A cultivator-tooth constructed on this plan possesses the advantages of being substantially made and easily and strongly attached to the machine, and that at a cost less than other cultivator-teeth can be made of equal quality.

To enable others skilled in the art to make, construct, and use my invention, I will now proceed to describe its parts in detail.

A tooth constructed on my present plan is made of two principal parts of peculiar construction, the first of which consists of the head or cap piece A and the second of the body of the tooth B, the latter of which is cut out of sheet metal of the proper size and thickness and then swaged into proper form for a tooth, as represented in Fig. 4, it being provided with a couple of ears, *a*, for a purpose to be hereinafter described.

The head or cap piece A may be made of wrought-iron swaged into proper form, or it may be cast, for which purpose malleable iron is deemed preferable. This piece consists of a plate, *b*, on the lower side of which is formed or otherwise secured a flange, *c*, of a shape corresponding exactly with the interior conformation of the shank B of the tooth, which it is made exactly to fit. The plate *b* is made to project sufficiently far over and around the flange to form a metallic bearing for the upper edge of the shank. The lip or projection *d* thus formed, however, is not made to extend all around the plate, but is cut off flush with the flange *c* on both sides at a point sufficient to receive the ears *a* of the shank B between it and the outer ends of the cap-piece. The tooth and cap-piece thus formed are then fitted to each other and holes *e* drilled through them, by means of which they may be riveted or screwed together, as may be deemed most advisable, thus finishing the tooth, previous to which, however, a hole, *f*, is first pierced through the plate *b* of the cap-piece, for the reception of the screw-bolt *g*, by which the tooth is secured to the frame of the machine. The head of the bolt as a general rule will be made to fit the interior of the cap-piece, which will materially assist in the fastening of the tooth to the machine, as in tightening the nut it will prevent the bolt from turning with it. If deemed preferable, however, the bolt may be riveted or otherwise secured to the cap-piece.

In fitting the tooth to the machine two mortises are cut into the frame, into which the ears *a* of the tooth fit for the purpose of preventing lateral play or working of the tooth.

Having thus fully described my invention, what I claim as new, and desire to secure by Letters Patent, is—

The method herein described of securing cultivator-teeth formed of sheet metal to the frame by means of a head or cap piece constructed in the manner substantially as described.

In testimony whereof I hereunto subscribe my name.

CHAS. H. SAYRE.

Witnesses:
   B. F. SHERWOOD,
   WILLIS SHERWOOD.